US009672192B2

(12) United States Patent
Tinker et al.

(10) Patent No.: US 9,672,192 B2
(45) Date of Patent: Jun. 6, 2017

(54) HIGH PERFORMANCE IMPLEMENTATION OF THE FFT BUTTERFLY COMPUTATION

(71) Applicant: TEXAS INSTRUMENTS INCORPORATED, Dallas, TX (US)

(72) Inventors: Darrell E. Tinker, Austin, TX (US); Keerthinarayan Heragu, Richardson, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 71 days.

(21) Appl. No.: 14/938,017

(22) Filed: Nov. 11, 2015

(65) Prior Publication Data

US 2016/0132461 A1    May 12, 2016

Related U.S. Application Data

(60) Provisional application No. 62/078,170, filed on Nov. 11, 2014.

(51) Int. Cl.
*G06F 17/14* (2006.01)
(52) U.S. Cl.
CPC .................................. *G06F 17/142* (2013.01)
(58) Field of Classification Search
CPC ............................... G06F 17/14; G06F 17/142
See application file for complete search history.

(56) References Cited

U.S. PATENT DOCUMENTS

| 4,996,661 | A  | * | 2/1991 | Cox | ......................... | G06F 7/483 |
|  |  |  |  |  |  | 708/508 |
| 5,941,940 | A  | * | 8/1999 | Prasad | ................... | G06F 17/142 |
|  |  |  |  |  |  | 708/404 |
| 6,477,554 | B1 | * | 11/2002 | Aizenberg | ............ | G06F 17/142 |
|  |  |  |  |  |  | 708/404 |
| 7,433,909 | B2 | * | 10/2008 | Scheuermann | ..... | G06F 15/7867 |
|  |  |  |  |  |  | 708/400 |
| 7,613,858 | B1 | * | 11/2009 | Jackson | ................ | G06F 17/142 |
|  |  |  |  |  |  | 710/104 |
| 8,001,171 | B1 | * | 8/2011 | Simkins | ................ | G06F 17/142 |
|  |  |  |  |  |  | 708/404 |

* cited by examiner

*Primary Examiner* — Chuong D Ngo
(74) *Attorney, Agent, or Firm* — Robert D. Marshall, Jr.; Charles A. Brill; Frank D. Cimino

(57) ABSTRACT

This invention is a FFT butterfly circuit. This circuit includes four temporary data registers connected to three memories. The three memories include read/write X and Y memories and a read only twiddle coefficient memory. A multiplier-accumulator forms a product and accumulates the product with one of two accumulator registers. A register file with plural registers is loaded from one of the accumulator registers or the fourth temporary data register. An adder/subtracter forms a selected one of a sum of registers or a difference of registers. A write buffer with two buffers temporarily stores data from the adder/subtracter before storage in the first or second memory. The X and Y memories must be read/write but the twiddle memory may be read only.

3 Claims, 2 Drawing Sheets

200

| Cycle | Memory | MAC | Move/Shift | Add/Subtract |
|---|---|---|---|---|
| 1 | $X \leftarrow XM(X_{2r})$ <br> $Y \leftarrow ZM(W_r)$ | | | |
| 2 | $X \leftarrow ZM(W_r)$ <br> $Y \leftarrow YM(X_{2i})$ | $Acc_0 \leftarrow X*Y$ <br> $X_t \leftarrow X$ | | |
| 3 | $M \leftarrow XM(X_{1r})$ <br> $X \leftarrow ZM(W_i)$ | $Acc_1 \leftarrow X*Y$ | | |
| 4 | $M \leftarrow YM(X_{1i})$ <br> $Y \leftarrow ZM(W_i)$ | $Acc_0 \leftarrow Acc_0 - X*Y$ <br> $X \leftarrow X_t$ | $R_0 \leftarrow M$ | |
| 5 | | $Acc_1 \leftarrow Acc_1 + X*Y$ | $R_2 \leftarrow Acc_0$ <br> $R_1 \leftarrow M$ | |
| 6 | | | $R_3 \leftarrow Acc_1$ | $B_0 \leftarrow R_0 - R_2$ |
| 7 | | | | $B_1 \leftarrow R_1 - R_3$ |
| 8 | $XM(X_{2r}) \leftarrow B_0$ | | | $B_0 \leftarrow R_0 + R_2$ |
| 9 | $YM(X_{2i}) \leftarrow B_1$ | | | $B_1 \leftarrow R_1 + R_3$ |
| 10 | $XM(X_{1r}) \leftarrow B_0$ | | | |
| 11 | $YM(X_{1i}) \leftarrow B_1$ | | | |

*FIG. 2*

HIGH PERFORMANCE IMPLEMENTATION OF THE FFT BUTTERFLY COMPUTATION

CLAIM OF PRIORITY

This application claims priority under 35 U.S.C. 119(e)(1) to U.S. Provisional Application No. 62/078,170 filed Nov. 11, 2014.

TECHNICAL FIELD OF THE INVENTION

The technical field of this invention is data processors for Fast Fourier Transform (FFT) butterfly computations.

BACKGROUND OF THE INVENTION

An FFT butterfly performs the following calculations:

$$T_r = (X_{2r} * W_r) - (X_{2i} * W_i);$$

$$T_i = (X_{2i} * W_r) - (X_{2r} * W_i);$$

$$X_{1r}' = X_{1r} + R_r;$$

$$X_{1i}' = X_{1i} + T_i;$$

$$X_{2r}' = X_{1r} - T_r;$$

$$X_{2i}' = X_{1i} - T_i;$$

where: $X_{1r}$ and $X_{2r}$ are respective first and second real coefficients; $X_{1i}$ and $X_{2i}$ are respective first and second imaginary coefficients; $W_r$ is a real twiddle factor; $W_i$ is an imaginary twiddle factor; $T_r$ is a real temporary variable; $T_i$ is an imaginary temporary variable; and $X_{1r}'$, $X_{2r}'$, $X_{1i}'$ and $X_{2i}'$ are respective updated coefficients. These calculations can be efficiently performed in 4 cycles/butterfly employing: a single multiplier/accumulator; an adder; plus overhead circuits, measured relative to theoretical minimum overhead of $4*(N/2)*log2(N)$.

Existing techniques, such as the Ceva TeakLite III DSP, have higher overhead partly because they only have enough memory bandwidth to support the data reads and writes. Extra memory bandwidth cycles are required to read new twiddle factors from memory.

SUMMARY OF THE INVENTION

This invention is a FFT butterfly circuit. This circuit includes four temporary data registers connected to three memories. The three memories include read/write X and Y memories and a read only twiddle coefficient memory. A multiplier-accumulator forms a product and accumulates the product with one of two accumulator registers. A register file with plural registers is loaded from one of the accumulator registers or the fourth temporary data register. An adder/subtracter forms a selected one of a sum of registers or a difference of registers. A write buffer with two buffers temporarily stores data from the adder/subtracter before storage in the first or second memory. The X and Y memories must be read/write but the twiddle memory may be read only.

BRIEF DESCRIPTION OF THE DRAWINGS

These and other aspects of this invention are illustrated in the drawings, in which:

FIG. 2 illustrates the sequence of operations using the hardware of FIG. 1 to calculate an FFT butterfly.

DETAILED DESCRIPTION OF PREFERRED EMBODIMENTS

Figure 1:
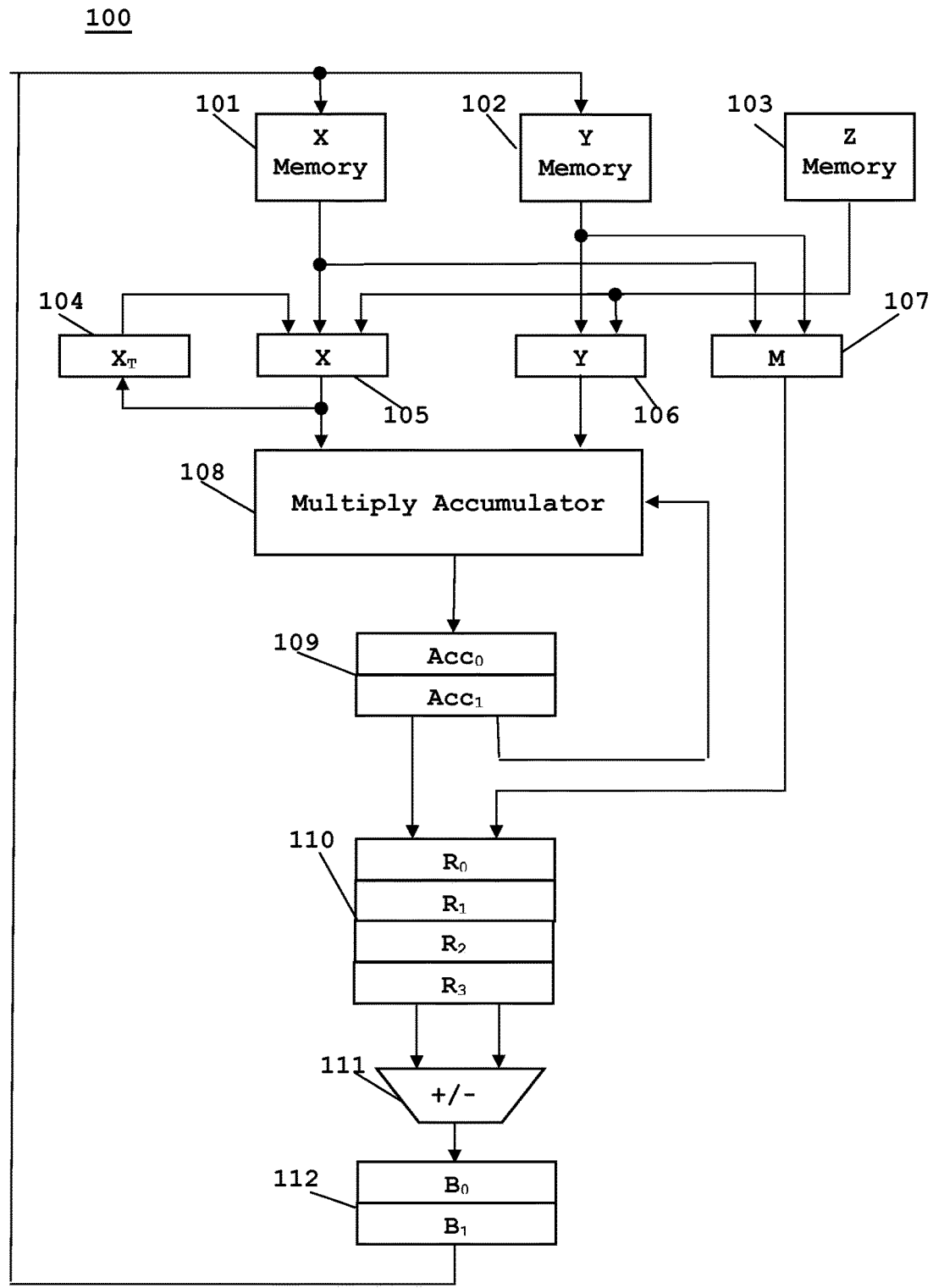
FIG. 1 illustrates the FFT butterfly circuit of this invention.

This invention achieves low overhead in FFT butterfly calculations by employing the following. This invention uses both of the X and Y data/coefficient memories to provide the needed data bandwidth, using X for the real data and Y for the imaginary data. This invention uses a third Z read-only memory for the twiddle factor coefficients. The register configuration of this invention supports 4-cycle data flow. This invention employs two accumulators, an XT register to save X value for reuse, an M register to pipeline data to the register file and 4 general purpose registers. This invention employs a write buffer that allows output data writes to be aligned with the memory cycles not used for data reads.

FIG. 1 illustrates FFT butterfly circuit 100 of this invention. The X coefficients are stored in X memory 101. The Y coefficients are stores in Y memory 102. Memories 101 and 102 must be read/write memories (such as DRAM) to store the data input and the calculation results. The twiddle factors are stored in Z memory 103. These twiddle factors do not change. Therefore Z memory 103 need be only a read memory (such as ROM). Z memory 103 may also be read/write memory as used for memories 101 and 102.

There are four temporary data registers 104, 105, 106 and 107 connected as follows. $X_T$ register 104 can be loaded from X register 105. Data stored in $X_T$ register 104 can be transferred to X register 105. X register 105 can be loaded from $X_T$ register 104, from data recalled from a particular address in X memory 101 and from data recalled from a particular address in Z memory 103. The output from X register 105 may be loaded into $X_T$ register 104 and supplied to a first product input of multiply accumulator 108. Y register 106 can be loaded from data recalled from a particular address in Y memory 102 and from data recalled from a particular address in Z memory 103. The output from Y register 106 is supplied to a second product input of multiply accumulator 108. M register 107 can be loaded from data recalled from a particular address in X memory 101 and from data recalled from a particular address in Y memory 102. The output from M register 107 is stored in a specified register ($R_0$, $R_1$, $R_2$ or $R_3$) of register file 110.

Multiply accumulator 108 includes two product inputs connected to respective X register 105 and Y register 106. Multiply accumulator 108 includes a sum input from accumulator 109. Multiply accumulator 108 forms a product of the two product inputs and forms a selected addition or subtraction of this product with the sum input. The result is stored in accumulator 109 replacing the accumulator value supplied to the sum input. Thus the product is added to or subtracted from one of the accumulator contents and the sum is stored back in the same accumulator.

Accumulator 109 includes one input from multiply accumulator 108. Accumulator 109 stores this input into a selected one of Acc0 or Acc1. Accumulator 109 includes two outputs. Accumulator 109 may transfer data from a selected one of Acc0 or Acc1 to a specified register ($R_0$, $R_1$, $R_2$ or $R_3$) of register file 110. Accumulator 109 supplies data from a selected one of Acc0 or Acc1 to the sum input of multiply accumulator 108.

Register file 110 has two inputs. Register file 110 may be loaded from accumulator 109 or from M register 107. This load is always to a specified register ($R_0$, $R_1$, $R_2$ or $R_3$).

Register file 110 has two outputs. Data from a first specified register ($R_0$, $R_1$, $R_2$ or $R_3$) may be supplied to a first input of adder/subtracter 111. Data from a second specified register ($R_0$, $R_1$, $R_2$ or $R_3$) may be supplied to a second input of adder/subtracter 111.

Adder/subtracter 111 has two inputs from register file 110. Adder/subtracter 111 forms a selected one of the sum or the difference of its two inputs. The sum or difference output of adder/subtracter 111 is supplied to write buffer 112.

Write buffer 112 has one input receiving the sum or difference output of adder/subtracter 111. Write buffer 112 includes two buffers $B_0$ and $B_1$. The sum or difference output received from adder/subtracter 111 is stored in a selected one of these buffers $B_0$ and $B_1$. Write buffer 112 has one output. Write buffer 112 may transfer data from a selected one of buffers $B_0$ or $B_1$ to a particular address in X memory 101 or to a particular address in Y memory 102. This transfer stores the results of the butterfly computation back to memory.

FIG. 2 illustrates table 200 showing how FFT butterfly circuit 100 is controlled to compute the butterfly. Each row of table 200 is one operational cycle of FFT butterfly circuit 100. The first column lists the operational cycle. The second column lists memory operations. The third column lists multiply accumulate operations. The fourth column lists data transfers into register file 110. The fifth column lists operations of adder/subtracter 111.

During cycle 1, X register 105 is loaded from X memory 101 from an address storing a second real term $X_{2r}$. Also during cycle 1, Y register 106 is loaded from Z memory 103 from an address storing a real twiddle factor $W_r$.

During cycle 2, X register 105 is loaded from Z memory 103 from an address storing the real twiddle factor $W_r$. Y register 106 is loaded from Y memory 102 from an address storing a second imaginary term $X_{2i}$. Multiply accumulator 108 and accumulator 109 store the product of X and Y in $Acc_0$. Lastly, still during cycle 2, $X_T$ register 104 is loaded from X register 105.

During cycle 3, M register 107 is loaded from X memory 101 from an address storing a first real term $X_{1r}$. X register 105 is loaded from Z memory 103 from an address storing an imaginary twiddle factor $W_i$. Also during cycle 3, multiply accumulator 108 and accumulator 109 store the product of X and Y in $Acc_1$.

During cycle 4, M register 107 is loaded from Y memory 102 from an address storing a first imaginary term $X_{1i}$. Y register 105 is loaded from Z memory 103 from an address storing an imaginary twiddle factor $W_i$. Multiply accumulator 108 and accumulator 109 store the difference between $Acc_0$ and the product of X and Y in $Acc_0$. X register 105 is loaded from $X_T$ register 104. Lastly, register $R_0$ is loaded from M register 107.

During cycle 5, multiply accumulator 108 and accumulator 109 store the sum of $Acc_1$ and the product of X and Y in $Acc_1$. Register $R_1$ is loaded from M register 107. Lastly, register $R_2$ is loaded from $Acc_0$.

During cycle 6, register $R_3$ is loaded from $Acc_1$. Also during cycle 6, adder/subtracter 111 subtracts $R_2$ from $R_0$ and stores the difference in write buffer $B_0$.

During cycle 7, adder/subtracter 111 subtracts $R_3$ from $R_1$ and stores the difference in write buffer $B_1$.

During cycle 8, the contents of write buffer $B_0$ are written into X memory 101 at an address of a second real term $X_{2r}$. Also during cycle 8, adder/subtracter 111 adds $R_0$ to $R_2$ and stores the sum in write buffer $B_0$.

During cycle 9, the contents of write buffer $B_1$ are written into Y memory 102 at an address of a second imaginary term $X_{2i}$. Also during cycle 9, adder/subtracter 111 adds $R_1$ to $R_3$ and stores the sum in write buffer $B_1$.

During cycle 10, the contents of write buffer $B_0$ are written into X memory 101 at an address of a first real term $X_{1r}$.

During cycle 11, the contents of write buffer $B_1$ are written into Y memory 102 at an address of a first imaginary term $X_{1i}$.

The memory configuration of this invention provides the needed data/coefficient read/write bandwidth without requiring a double width bus to data memory. The register configuration and write buffer efficiently of this invention supports 4-cycle/butterfly calculation. The inventors believe this invention provides the highest FFT performance of any known DSP in an area efficient engine. This invention addresses a broad application space.

What is claimed is:

1. A FFT butterfly circuit comprising:
    a first temporary data register having an input and an output;
    a second temporary data register having a first input connected to said output of said first temporary register, a second input loadable from a specified address of a first memory, a third input loadable from a specified address of a second memory and an output connected to said input of said first temporary data register;
    a third temporary data register having a first input loadable from a specified address of a third memory, a second input loadable from a specified address of said second memory and an output;
    a fourth temporary data register having a first input loadable from a specified address of said first memory, a second input loadable from a specified address of said third memory and an output;
    a multiplier-accumulator having a first product input connected to said output of said second temporary register, a second product input connected to said output of said third temporary register, a sum input and an output, said multiplier-accumulator forming a product of data on said first product input and said second product input and selectable adding to or subtracting from data on said sum input, and a output;
    an accumulator including two accumulator registers having one input connected to said output of said multiply accumulator for storing data on said input in a specified one of said accumulator registers, a first output supplying data from the non-specified accumulator register and a second output connected to said sum input of said multiplier accumulator supplying data from the specified accumulator register;
    a register file including a plurality of registers having a first input connected to said first output of said accumulator for storing data at said first input in a first specified one of the plurality of registers, a second input connected to said output of said fourth temporary register for storing data at said second input in a second specified one of the plurality of registers, a first output for supplying data from a third specified one of the plurality of registers and a second output for supplying data from a fourth specified one of the plurality of registers;
    an adder/subtracter having a first input connected to said first output of said accumulator, a second input connected to said second output of said accumulator and an output supplying a selected one of a sum of data on said first input and on said second input or a difference of said second input from said first input; and a write buffer including two buffers having an input connected to said output of said adder/subtracter for storing data at said input in a specified one of the buffers and an output supplying data from a specified one of the buffers.

2. The FFT butterfly circuit of claim 1 further comprising:

a first memory having an input connected to said output of said write buffer and an output connected to said second input of said second temporary register and to said first input of said fourth temporary register;

a second memory having an output connected to said third input of said second temporary register and to said second input of said third temporary register; and a third memory having an input connected to said output of said write buffer and an output connected to said first input of said third temporary register and to said second input of said fourth temporary register.

3. The FFT butterfly circuit of claim 1, wherein:

said first memory and said third memory comprise read/write memory; and said second memory comprises read only memory.

* * * * *